June 2, 1970 SADANOBU MORIUCHI 3,515,190
SLICER
Filed Jan. 4, 1968 5 Sheets-Sheet 4

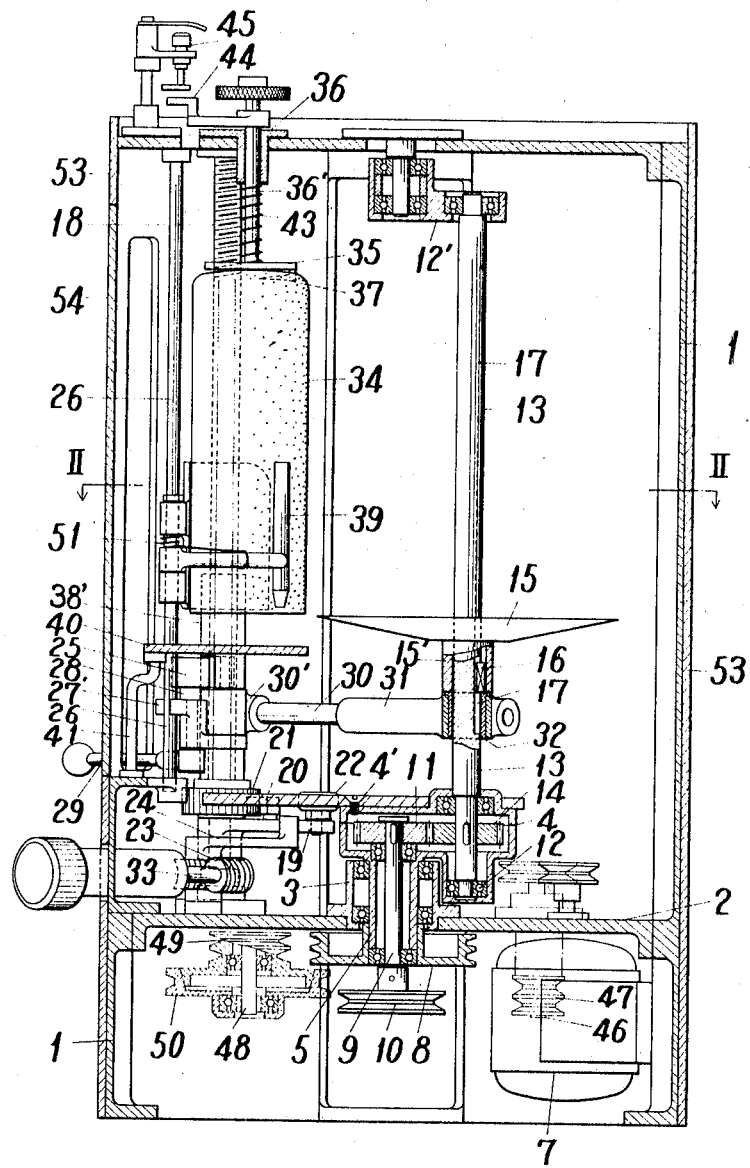

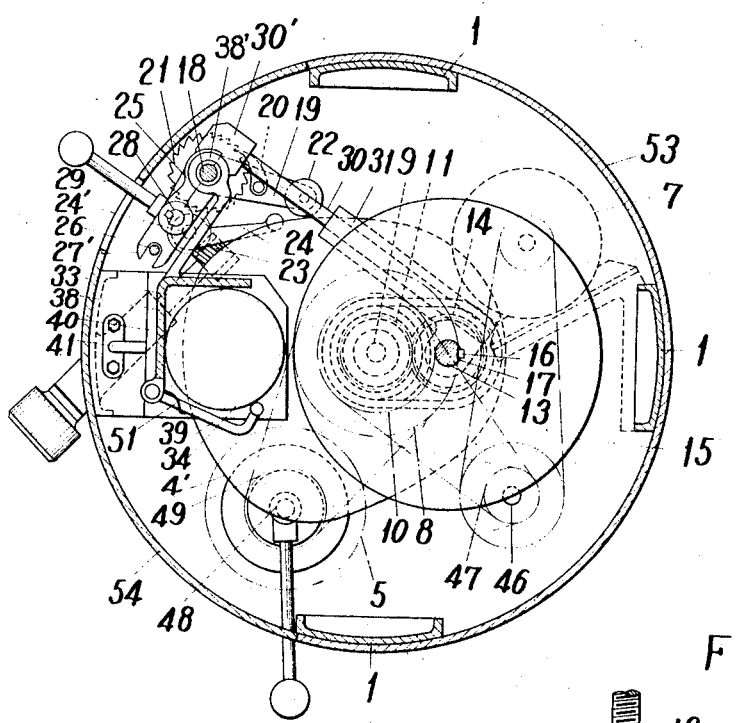
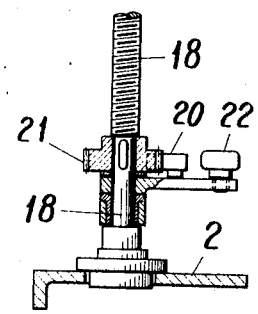
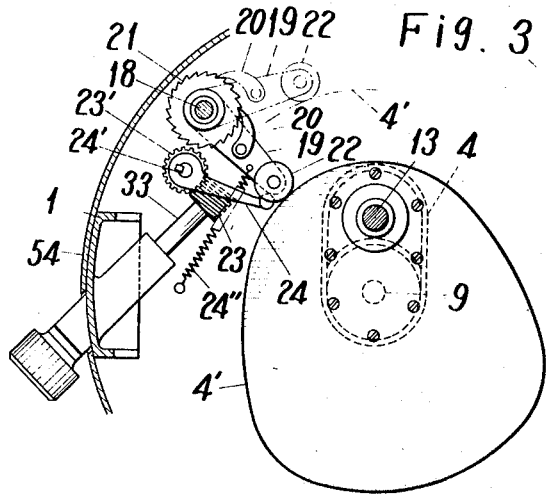

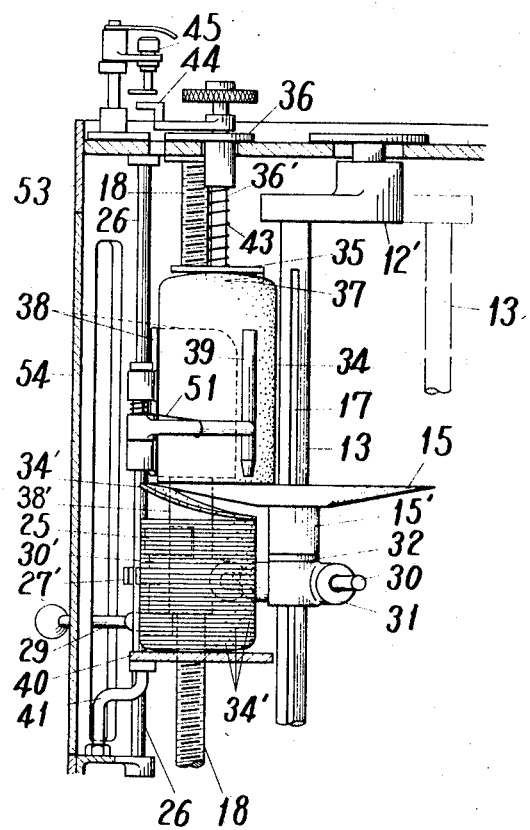
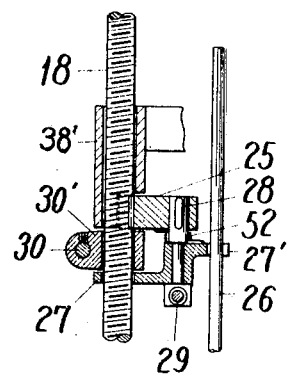
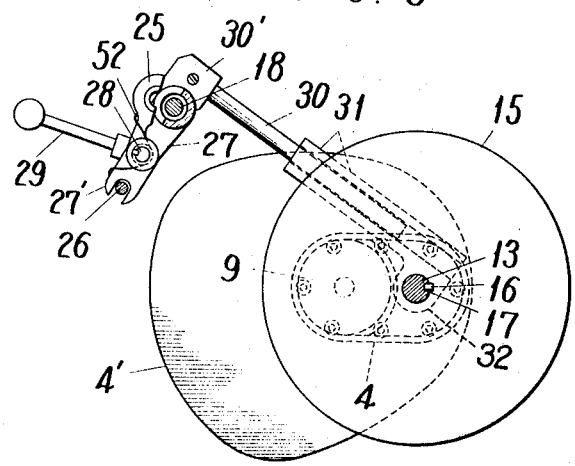

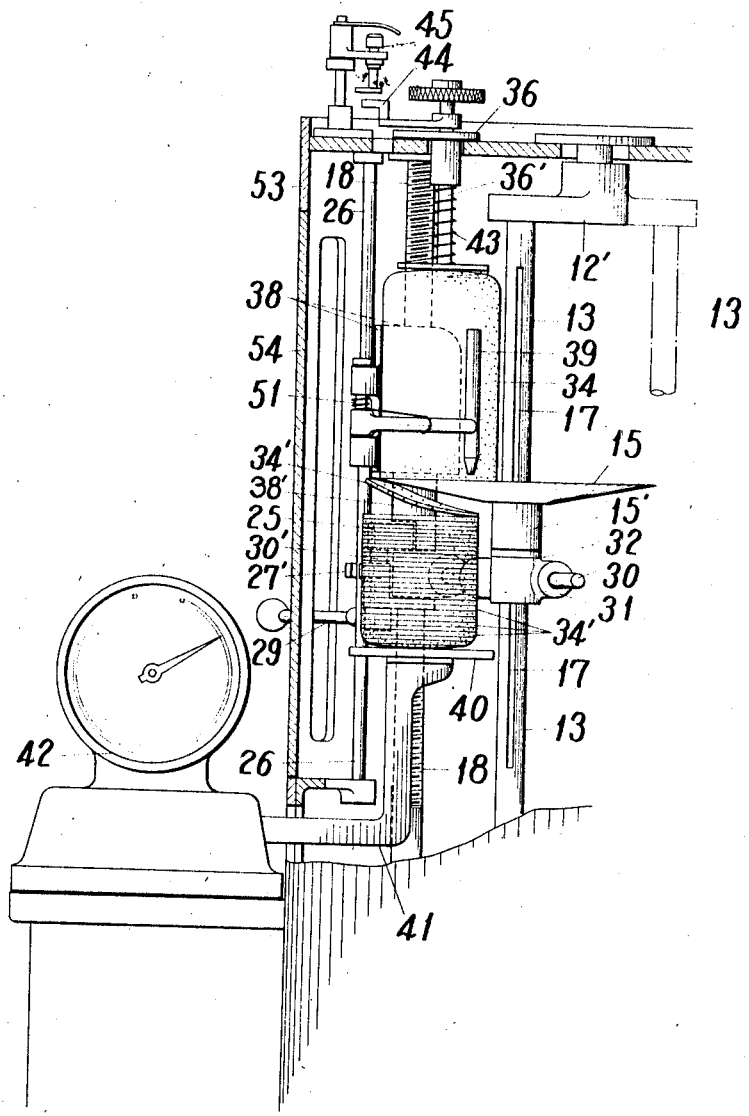

United States Patent Office 3,515,190
Patented June 2, 1970

---

3,515,190
SLICER
Sadanobu Moriuchi, Nara Prefecture, Japan, assignor to Nantsune Tekko Kabushiki Kaisha (Nantsune Iron Works, Ltd.), Osaka, Japan
Filed Jan. 4, 1968, Ser. No. 695,765
Claims priority, application Japan, June 23, 1967, 42/40,221
Int. Cl. B26d 4/40
U.S. Cl. 146—101    5 Claims

ABSTRACT OF THE DISCLOSURE

A slicer having a rotary blade adapted to automatically slice a material held in an immovable condition one by one in a predetermined thickness while making an eccentric revolution, a mechanism to adjust the thickness of sliced pieces as desired and a device to weigh automatically the sliced pieces as they are sliced and piled on a slice-receiving plate.

---

Figure 8:
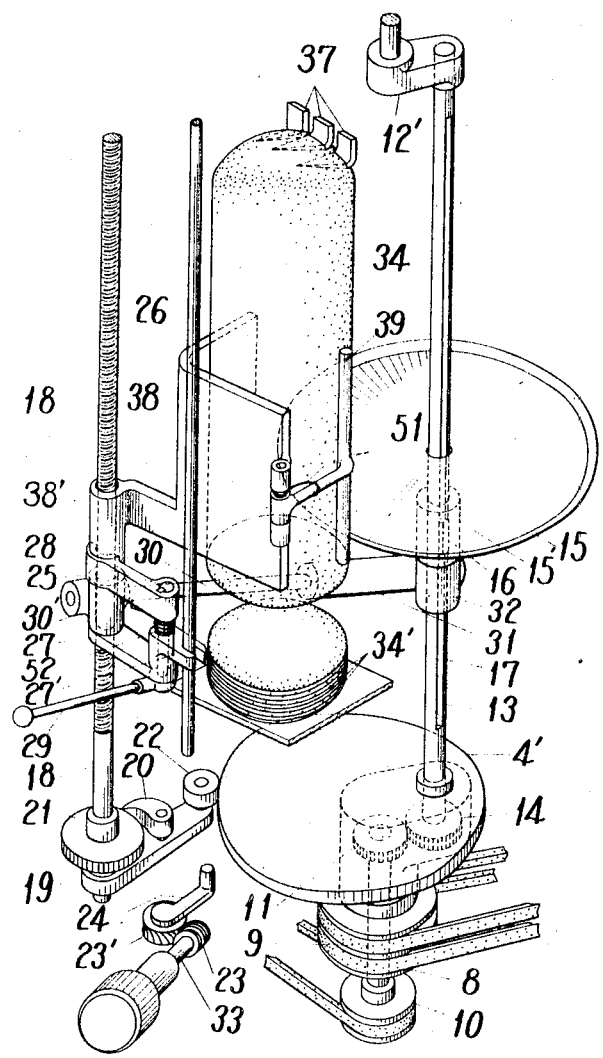

This invention relates to a slicer and more particularly, has for an object the provision of an improved type of a slicer in which a rotary blade rotatably mounted on a machine frame for high speed rotation is adapted to rotate with a point eccentric to its own axis of rotation as the center of its revolution, and a material to be sliced held in an immovable condition within the locus defined by the outer periphery of the rotary blade during the latter's revolution is sliced by means of the rotary blade upon each complete revolution, with the blade being arranged in such a manner that, with the completion of each slicing operation, it moves automatically in a direction perpendicular to the direction of its revolution by a distance corresponding to the predetermined thickness of a sliced piece to enter the succeeding slicing motion, thereby permitting this operation to be repeated continuously until the material is cut from its open end into slices of the desired thickness.

Another object of this invention is to provide a mechanism for continually and automatically performing a slicing operation to the finish, upon the completion of which the machine operation is automatically stopped.

Yet another object of this invention is to provide means for adjusting the thickness of the sliced pieces.

A still another object of this invention is to provide means for automatically weighing the sliced pieces by connecting a slice-receiving plate to a scale.

The slicer of the present invention offers great advantages since, unlike the known types which normally employ the reciprocating motion of a cutter or blade means, the rotary blade rotates in one direction only, thereby ensuring a smooth, quiet and shockless slicing operation, and the slicing operation can be continued automatically until the terminal end of the material is sliced, whereupon the machine operation is stopped automatically.

The nature and further advantages of this invention will become more apparent from the following description made in reference to the accompanying drawings, in which FIG. 1 is a view partly in front elevation and partly in vertical section of a slicer according to the present invention, FIG. 2 is a view taken along the section line II—II in FIG. 1 the view looking in the direction of the arrows, FIG. 3 is a plan view of a mechanism for adjusting the thickness of sliced pieces, FIG. 4 is a view partly in side elevation and partly in vertical section of the lower end portion of a screw rod of the mechanism shown in FIG. 3, FIG. 5 is a view in side elevation showing the condition in which a material is sliced, FIG. 6 is a plan view showing the mechanism of a push-up plate which operates to move a rotary blade upward by the revolution of the screw rod, FIG. 7 is a view partly in elevation and partly in vertical section of part of the mechanism illustrated in FIG. 6, FIG. 8 is a perspective view showing the main components of the slicer, and FIG. 9 is a side view of a mechanism in which a support arm member for a slice-receiving plate is connected to a weighing scale.

Referring to the drawings which show a slicer embodiment of the vertical type, a bearing tube 3 is secured to a base plate 2 of a machine frame 1. Rotatably mounted in and extending through the bearing tube 3 is a rotary hub shaft 5 of a main driving plate 4. The hub shaft 5, to which a transmission wheel 8 is secured, is driven by an electric motor 7. Also rotatably mounted in and extending through the hub shaft 5 is a shaft 9 carrying at its lower end a transmission wheel or pulley 10 driven by the electric motor 7 through suitable transmission members and at its upper end a gear wheel 11. Disposed on the driving plate 4 eccentrically to the shaft 5 is another bearing tube 12. A rotary shaft 13 is disposed with its lower end journalled in the bearing tube 12 and its upper end journalled in an arm piece 12' pivotally secured to the upper part of the machine frame. To the lower end of shaft 13 is secured a gear wheel 14 which meshes with the gear wheel 11 of the shaft 9. A rotary blade 15 is mounted on the shaft 13.

Under the above arrangements, while the shaft 13 of the rotary blade 15 turns at a high speed on its own axis by driving through the transmission wheel 10, it revolves around the hub shaft 5 of the driving plate upon the turning of the latter by driving through the transmission wheel 8.

The rotary blade 15 is fitted to the shaft 13 by positioning loosely a projection 16 of the rotary blade 15 in a longitudinal groove 17 provided on one side of the shaft 13 so as to cause the rotary blade 15 to slide upward and downward being guided by the longitudinal groove 17. It will also be clear that the rotary blade 15 is adapted to rotate in a body with the shaft 13 at all times.

The foregoing description is made chiefly in reference to the slicing mechanism which is operable by both the revolution on its own axis 13 and the rotation around the shaft 5 of the rotary blade.

Referring next to other mechanisms of the present invention, a cam plate 4' is secured to the upper surface of the driving plate 4 with which it revolves in a body. In parallel with the shaft 13, is disposed a screw rod 18 having its lower end rotatably received in the base plate 2 and its upper end rotatably received in the ceiling or upper end of the machine frame.

The screw rod 18 carries at its base part a loosely fitted swingable arm 19 having a roll 22 at its end, which is always forced to be drawn inwardly by a spring means 24" and carries at its base part a fixed ratchet wheel 21. A pawl 20 to turn the ratchet wheel is mounted on the swingable arm 19.

The swingable arm 19, when the driving plate 4 rotates on the hub shaft 5 as its axis, swings in the same direction as the roll 22 which is pushed outwardly by the cam plate 4'. This swinging motion urges the pawl 20 to turn the ratchet wheel 21 which in turn causes the screw rod 18 to turn by a distance corresponding to the amount of the swing. When released from the pressing by the cam plate 4', the swingable arm returns to the original position, via the action of the spring means 24''. Thus, upon each complete turn of the cam plate 4', one complete rotation of the screw rod 18 is effected by the swinging motion of the swingable arm 19. This rotation of the screw rod 18, together with other mechanisms as described hereinafter, causes the rotary blade 15 to move upward by a distance corresponding to the predetermined thickness of a sliced piece. Therefore, with an increase of the amount of turning of the ratchet wheel 21, the amount of upward movement of the rotary blade 15 increases, with the result that a larger thickness of a sliced piece is obtained. On the other hand, with a decrease of the amount of this turn, the amount of upward movement of the rotary blade 12 decreases, with the result that a smaller thickness of the sliced piece is obtained. Thus, only by adjusting the amount of the swinging motion of the swingable arm 19 or the amount of the turn of the ratchet wheel 20, can the thickness of the sliced piece be adjusted. The upper limit of this swinging motion of the swingable arm 19 is naturally defined by the altitude of the cam plate 4 and a swinging motion beyond the upper limit is impossible. Therefore, there is no other way but to change its lower limit or the position at which the swinging is started. This problem has successfully been solved by providing a stopper means for the swingable arm, as mentioned below.

A rotary shaft 24' is mounted on the base plate 2 and a stopper means 24 comprising a swingable piece is fixed to a base part of the shaft 24'. Engaging a worm wheel 23' disposed at the base part of the stopper means is a worm 23 on another shaft 33, by the manipulation of which horizontal shaft a tip of the stopper means 24 can be adjusted to and stopped at the desired position and, by means of the pulling force of spring means 24'', the tip of the swingable arm 19 is always urged to press upon the tip of the stopper 24. (The more the tip of the stopper means is drawn backward, the more the amount of turn of the ratchet wheel 21 and the resultant larger thickness of the sliced piece.)

A push-up plate 27 is loosely disposed at one end to the screw rod 18 and has its bifurcated other end embracing therebetween a guide rod 26 disposed on the machine frame 1 in parallel with the screw rod, so that the plate 27 may be permitted to move upward and downward but not rotate. A branch shaft 28 is disposed through the push-up plate 27, with the base of a female-screw arm 25 being fixed at its upper end and an operating lever 29 fixed at its lower end. By operating the lever 29, a half-cut female screw provided at the tip of the female-screw arm 25 is brought into engagement with or disengaged from a male screw of the screw rod 18.

A slide tube 30' is slidably disposed on the screw rod 18 between the push-up plate 27 and the female-screw arm 25. A rod 30 is secured horizontally to the side of the slide tube 30'. On the other hand, another slide tube 32 is slidably mounted on the shaft 13 of the rotary blade 15 at a position below the rotary blade. Received slidably in a tubular sleeve member 31 secured horizontally to the side of the slide tube at a position opposite the horizontal rod 30 is the tip of the horizontal rod 30, whereby a flexible connection between the screw rod 18 and the shaft 13 of the rotary blade is achieved.

A tubular part 38', which is the base end of a holder plate 38 to hold a material to be sliced, is loosely mounted on the screw rod 18 at a position above the female-screw arm 25. The holder plate 38 carries at one end a control or presser rod 39 provided with a spring means 51 adapted to hold the control rod 39 constantly in contact with the material.

As is understood from the foregoing description, since all of the above-mentioned three elements, i.e. the tubular base portion 38' of the holder plate 38, the slide tube 30' and the push-up plate 27 are mounted only loosely on the screw rod 18, they cannot stop themselves at any intermediate position on the screw rod. It is only when the half-cut female screwed coupler of the female-screw arm 25 is brought into mesh with the male-screwed rod 18, that these three elements are permitted to stop at their respective positions.

Since the shaft 13 and the screw rod 18 are operably connected by means of the slide tubes 30' and 32, the rod 30 and the coupler sleeve member 31, when the slide tube 30' on the rod 18 moves upward, the slide tube 32 on the shaft 13 moves upward simultaneously, and when the former moves downward, the latter also moves downward. Because of this connection, the simultaneous upward and downward movements of the rotary blade 15 and the holder plate 38 are effected.

Under such arrangements, when the swingable arm 19 is swung outward by the cam plate 4' and the ratchet wheel 21 and the screw rod 18 are turned by means of the ratchet pawl 20, the half-cut female coupler of the arm 25 turns spirally by the same amount and moves up on the screw rod 18. By the upward movement of the female-screw arm 25, the holder plate 38, push-up plate 27 and slide tube 30' are moved upward and at the same time the rotary blade 15 advances upward. In other words, the rotary blade 15 and the holder plate 38 move upward together by a distance corresponding to the thickness of a sliced piece to assume the respective positions to carry out the next slicing operation. The description so far has related mainly to the mechanisms for the automatic advance of the rotary blade and the holder plate upon completion of one cycle of the slicing operation and for the adjustment of the amount of their advance.

Now, a material to be cut 34 is hung within the locus defined by the outer periphery of the rotary blade 15 while rotating around the shaft 5. The material is hung in such a manner that the upper end of the material 34 is thrust in by a set of claws 37 of a holder 35 which is fixed by a fitting base 36 onto the machine frame 1. The material 34 in suspension is prevented from swinging by means of a lateral holding by the holder plate 38 and the control or presser rod 39, as already described.

Referring to FIG. 1, 43 is a spring member coiled around a screw rod 36' of the fitting base 36 so as to press the material 34 downward by its force, and 44 is a control means provided on the fitting base 36 and adapted to adjust the distance between the holder 35 and itself to a desired degree by the screw rod 36' of the fitting base 36. 45 is a switch provided on the machine frame 1. With the progress of slicing of the material in accordance with the sequence already described, the rotary blade 15 and the holder plate 38 continually move upward and finally reach the highest limit after finishing slicing of the terminal end of the material, whereupon the control member 44 is pushed up by the upper end of the holder plate 38 with the result that the switch 45 is cut off and the machine operation is automatically stopped.

Since the holder plate 38 and the control rod 39 for holding the material 34 are required to move upward freely with the progress of the slicing operation as already described, it is so disposed that they do not press the material 34 too hard, but hold it gently.

Underneath the material 34 is a receiving plate 40 rigidly secured to the machine frame 1 by a support arm 41, or alternatively, the support arm 41 of the receiving plate 40 may be extended and connected to a scale 42 for the automatic weighing of the sliced pieces which are piled on the receiving plate 40.

Referring to FIG. 1, 46 is an intermediate shaft which is driven by a transmission from the electric motor 7.

Then, the rotation of the shaft 46 is transmitted by a flywheel 47 provided thereon to both the transmission wheel 10 of the shaft 9 and to a female clutch member 50 of a clutch shaft 48 and thence to a male clutch member 49 of the clutch shaft 48 and to the transmission wheel 8 of the hub shaft 5 through belts, respectively. 52 is a spring member so disposed as to press the female-screw arm 25 constantly for engagement with the screw rod 18 and 54 is an openable door provided on a covering plate 58 for the machine frame 1 to enclose the interior of the machine.

Now, referring to the method of use of the slicer in accordance with the present invention, the material 34 to be cut (for example, a ham) is hung in the machine by thrusting the claws 37 of the holder 35 into the upper end thereof. Then, by operating a handle 29, the half-cut coupler of the female-screw arm 25 is forced into engagement with the male screw of the screw rod 18. As this position of engagement determines automatically the positions of the rotary blade 15 and the holder plate 38 as previously mentioned, the engagement should be effected either at a position opposite to the lower end of the suspended material to permit the rotary blade to make the first slicing work or at some position slightly below the lower end of the suspended material so that the rotary blade may come up to a suitable position for the first slicing operation after several turns thereof. On the other hand, the position of the stopper means 24 in relation to the swingable arm 19 is adjusted to conform to the desired thickness of a sliced piece. The holder plate 38 and the control bar 39 are also adjusted to suit the shape of the material so as to embrace the lower portion of the suspended material.

On completion of the preparatory arrangements as mentioned above, the electric motor 7 is activated, whereupon the hub shaft 5 and shaft 9 are simultaneously rotated by the transmission of rotary motion of the motor. The rotation of the shaft 9 actuates through the gear wheels 11, 14 the high speed rotation of the rotary blade 15 mounted on the shaft 13, while the hub shaft 5 causes the main driving plate 4 to turn. Consequently, as already explained, the rotary blade 15 rotates around the hub shaft 5, while rotating itself. By means of the revolution of the rotary blade 15 around the shaft 5, the rotary blade 15 comes to pass the lower end of the suspended material 34 or moves away therefrom periodically and it is at the time of its passing under the lower end of the material that the slicing of the material is effected. Hence, the slicing is accomplished once in one cycle of revolution of the blade around the shaft 5. On the other hand, simultaneously with the revolution of the rotary blade 15, the cam plate 4' rigidly secured to the main driving plate 4 rotates and presses the roller with the raised portion of its periphery 22, whereupon the swingable arm 19 is moved sideways and the ratchet pawl 20 acts upon the ratchet wheel 21 to rotate the screw rod 18. By the rotation of the screw rod 18, the female-screw arm 25 which engages the rod 18 is moved upward to slide the holder plate 38 and hence the rotary blade 15 upward, whereupon these elements are made ready for the next slicing operation at the respective advanced positions.

Of course, the upward movement of the rotary blade 15 should not take place while it is cutting the material. Accordingly, it goes without saying that the mechanism for slicing should be designed with proper attention paid to the timed relation between the actions of the rotary blade 15 and the cam plate 4', whereby the upward movement of the rotary blade may be started after completion of each slicing operation and the slicing operation may be started after completion of the upward movement of the blade.

Each sliced piece 34', which has been obtained by repeated slicing operations by the rotary blade through its both rotation and revolution and the simultaneous upward advance movements of the rotary blade and the holder plate, naturally falls onto the receiving plate 40 provided thereunder and are accumulated thereon as indicated by index numeral 34". They are weighed automatically by means of the scale 42 connected to the support arm of the receiving plate 40, thereby permitting automatic weighing. When the slicing operation has been completed for the uppermost end of the material, the control member 44 is pushed up by the upper end of the holder plate 38, whereupon the switch 45 is cut off and the machine operation is automatically stopped, as previously explained.

According to the present slicer, the rotary blade 15 does not change its direction of rotation alternately, unlike the ones which have so far existed, but it always rotates in one direction only, thereby ensuring smooth, quiet and shockless slicing operation.

Secondly, it has an advantage in that slicing can be repeated automatically since, on completion of each slicing operation, the upward advance movements of the rotary blade 15 and the holder plate 38 automatically take place, making them ready for the next cutting operation automatically. Moreover since the amount of the upward movement controls the thickness of a sliced piece, sliced pieces of uniform thickness are obtainable.

Thirdly, the provision of a stopper means 24 for the swingable arm 19 has made it possible to adjust the travelling distance of the swingable arm 19 and consequently to adjust the thickness of the sliced piece as desired, so that sliced pieces of any desired thickness are secured.

Another advantage is that, since the distance between the upper surface of the accumulated sliced pieces 34' on the receiving plate and the bottom end of the material is kept constant from the start of the slicing operation to the end, the sliced pieces are accumulated under uniform condition automatically.

A still further advantage is that by connecting the support arm of the receiving plate 40 to the scale 42, an automatic weighing of sliced pieces is realized.

Having thus described the nature of my invention, what I claim herein is:

1. The slicer comprising a frame, a rotary blade disposed on said frame for rotation at high speed, means for causing said rotary blade to rotate with a point eccentric to its own axis of rotation as the axis of revolution, a holding device to hold a material to be sliced in position within a locus defined by the outer periphery of said rotary blade during its revolution, a mechanism for moving said rotary blade in a direction perpendicular to the direction of its revolution by a distance corresponding to the thickness of a sliced piece after finishing each slicing operation upon one complete revolution of said rotary blade, a shaft for said rotary blade, a screw rod disposed in parallel with said shaft for said rotary blade, ratchet means, a swingable arm mounted on said screw rod to rotate the latter through said ratchet means, a main driving plate, a cam plate fixed to said main driving plate to swing said swingable arm, said main driving plate constituting the means for revolving said rotary blade around a point eccentric to its own axis of rotation, a female screw arm removably disposed on said screw rod, and a mechanism for pushing up said rotary blade so disposed on said screw rod as to move in concert with said female-screw arm.

2. The slicer as defined in the foregoing claim 1, including a mechanism for adjusting the thickness of sliced pieces as desired by adjusting the amount of moving of said rotary blade.

3. The slicer as defined in claim 1, including a stopper device to adjust the lower limit of swinging of the swingable arm as desired.

4. The slicer as defined in claim 1, including a receiving plate provided right below the point of slicing to receive sliced pieces thereon and disposed in such a manner that it is not necessary to change its position vertically according to the amount of sliced pieces piled thereon.

5. The slicer as defined in claim 4, including a weighing scale and a support arm for said receiving plate connected to said weighing scale.

References Cited

UNITED STATES PATENTS

| | | | |
|---|---|---|---|
| 2,528,914 | 12/1950 | Roest et al. | 146—101 |
| 3,194,289 | 7/1965 | Lundell | 146—105 |
| 3,213,731 | 10/1965 | Renard | 83—490 X |

ANDREW R. JUHASZ, Primary Examiner

Z. R. BILINSKY, Assistant Examiner

U.S. Cl. X.R.

146—105